United States Patent [19]

Bowditch et al.

[11] 4,191,049

[45] Mar. 4, 1980

[54] SYSTEM FOR MEASURING OCEAN CURRENT

[75] Inventors: Philip N. Bowditch, Cohasset; John M. Dahlen, Duxbury; John F. McKenna, Jr., Gloucester; John T. Shillingford, Jr., Milton; Frank J. Siraco, Malden; William E. Toth, Bolton, all of Mass.

[73] Assignee: The Charles Stark Draper Laboratory, Inc., Cambridge, Mass.

[21] Appl. No.: 934,014

[22] Filed: Aug. 16, 1978

[51] Int. Cl.² .............................................. G01W 1/00
[52] U.S. Cl. .................................................. 73/170 A
[58] Field of Search ............................. 73/170 A, 300

[56] References Cited

U.S. PATENT DOCUMENTS

| | | | |
|---|---|---|---|
| 3,590,635 | 7/1971 | Duing | 73/170 A |
| 3,641,816 | 2/1972 | Chambolle et al. | 73/189 |
| 3,800,346 | 4/1974 | White | 73/170 A |
| 3,906,790 | 9/1975 | Brainard et al. | 73/170 A |
| 3,927,562 | 12/1975 | Hickey | 73/170 A |
| 3,952,349 | 4/1976 | Erath et al. | 73/170 A |

OTHER PUBLICATIONS

Van Leer, et al., "The Cyclesonde: an unattended vertical profiler for scalar & vector quantities in the upper ocean," Sea Research, 1974, vol. 21, pp. 385–400.

Primary Examiner—Anthony V. Ciarlante
Attorney, Agent, or Firm—Kenway & Jenney

[57] ABSTRACT

A system for measurement of ocean current near the surface wave field. The system includes a controlled buoyancy platform having a current sensor. Upper and lower plural roller assemblies are affixed to the platform for limiting platform motion along a guide line. In one form, each guide assembly includes a plurality of rollers adapted to freely track the guide line so that the platform is both substantially free to move along the guide line in response to pressure gradients from the surface wave field and also substantially decoupled from twisting and axial motions of the guide line.

7 Claims, 22 Drawing Figures

| FLAGS | | | | WRITE-PULSE POLARITIES | | | | INTERRUPT ENABLES | | | |
|---|---|---|---|---|---|---|---|---|---|---|---|
| ENCON/ | XR PAR | SPARE | FIL GAP | SPARE | x | ANALOG MUX | x | BUSY | DACH1 | BOT LINE | TOP LINE |

1

INITIALIZE TO 4040₈

NONE ENABLED

*Fig. 7G*

| 0 SENSE LEVEL | | | | 4 SENSE POLARITY | | | | 8 | | | 11 |
|---|---|---|---|---|---|---|---|---|---|---|---|
| UART | | REC RPT | TIME TICK | UART | | REC RPT | TIME TICK | x | x | x | x |
| DR | TBRE | | | DR | TBRE | | | | | | |

ALL EDGE-TIGGERED    ↑ ↑ ↓ ↓

INITIALIZE TO 0300₈

*Fig. 7H*

| FLAGS | | | | WRITE-PULSE POLARITY | | | | INTERRUPT ENABLES | | | |
|---|---|---|---|---|---|---|---|---|---|---|---|
| SPARE | REC REQ | SPARE | XR DATA | UART | x | EXR | x | UART | | REC RPT | TIME TICK |
| | | | | | | | | DR | TBRE | | |

0    1

ALL ENABLED

INITIALIZE TO 0057₈

*Fig. 7I*

SYSTEM FOR MEASURING OCEAN CURRENT

REFERENCE TO RELATED APPLICATIONS

This application is related to our U.S. Pat. Application Ser. Nos. 934,334 and 934,495, filed on even date herewith.

BACKGROUND OF THE INVENTION

This invention relates to oceanographic instrumentation and more particularly, to a system for cyclically measuring ocean characteristics between two levels.

Data gathering of oceanographic parameters has increased in recent years. Primarily, the prior art has utilized moored current meters to gather data representative of currents, as well as moored meters for temperature and other ocean characteristics. Time series recording of these data has been generated from fixed instruments on taut-wire moorings in the deep ocean and on continental shelf and slope locations. However, it has been observed that with the conventional current and other characteristic monitoring systems, long-term measurement in the near-surface region of the open ocean has been particularly difficult, particularly when data gathering has been taken within 200 meters of the surface. The data has exhibited gross dynamic errors introduced by the surface wave field. This upper ocean region is particularly important in studies since the dynamics are based on energy transfer between the atmosphere and the deep ocean. In addition, a significant amount of the horizontal transport of heat momentum takes place in that region.

The energy in horizontal currents is contained mainly is low frequency motions, with geostropic, tidal, and inertial motions accounting for the great bulk of the energy. In view of this relative low frequency of the parameter changes, unattended vertical profilers with periodic sampling have been developed in the prior art for monitoring certain scaler and vector quantities in the upper ocean. As an example of the prior art, U.S. Pat. No. 3,952,349 to Erath, et al. discloses a variable buoyancy device for automatically cycling an object, or platform having instrumentation, between upper and lower limits. This variable buoyancy device utilizes control of mean density to provide the cyclic vertical motion. The density control is accomplished by means of an inflatable bladder which is used together with a compressed gas supply and valve assembly to change the displacement of the system. In operation, the bladder is alternately inflated to control the buoyancy to be negative at a preselected low external pressure, and discharged into the ocean to control the buoyancy to be positive at a preselected high external pressure. Consequently, the instrumentation package coupled to the buoyant device cycles between the specified pressure points in the ocean. However, for long-term missions, this form of buoyancy control requires a relatively large bulk and mass apparatus particularly for gas storage.

It is an object of the present invention to provide an improved system for measuring ocean parameters.

It is another object of the present invention to provide an improved system for measuring ocean parameters, including a compact means for sustaining cyclic vertical motion throughout long-term immersion.

SUMMARY OF THE INVENTION

Briefly, the present invention provides a system for measuring ocean characteristics. The system includes a sensor assembly mounted on a platform, and an associated means to control the platform buoyancy.

In accordance with the present invention, ocean currents may be measured in deep water or alternatively in relatively shallow water, with substantially no effect from surface wave fields. In accordance with this aspect of the invention, a neutrally buoyant platform is provided with a current sensor in a manner whereby the platform is relatively free to move in the vertical direction in response to pressure waves from the surface wave field. In some forms of this invention, the platform may be constrained to motion along a mooring line, for example, by roller assemblies affixed to the upper and lower portions of the platform. In various forms of the invention, an inertial reference system may be utilized in conjunction with a computer to generate signals representative of the ocean current. In some forms of the invention, the computer includes means for resolving the current signals into orthogonal components.

BRIEF DESCRIPTION OF THE DRAWINGS

The foregoing and other objects of this invention, the various features thereof, as well as the invention itself, may be more fully understood from the following description, when read together with the accompanying drawings in which:

FIGS. 7A–7I show the data format for input/output instructions used in the ECS of FIG. 4;

DESCRIPTION OF THE PREFERRED EMBODIMENT

Briefly, the present inventiion provides a system for measuring ocean characteristics. The preferred embodiment includes a sensor assembly mounted on a platform, and an associated means to control the platform buoyancy. Buoyancy control is provided by a pump assembly including seawater displacement pistons and associated cylinder assemblies for trimming the platform buoyancy. As used herein, the term platform denotes a module or assembly which contains characteristic measuring sensors and other related instrumentation, including buoyancy control instrumentation. The platform may be closed or open. In the preferred embodiment, the displacement pistons include a rolling diaphragm seal to establish a water-tight seal between the pistons and the associated cylinder. The system further includes an actuator for selectively translating the pistons between two points in the associated cylinder assemblies so that the buoyancy may be trimmed as a function of the piston position. A torque motor is used in conjunction with ball screw and ball nut assemblies to actuate the pistons. In the preferred form of the invention, two pistons are utilized, however, in alternative configurations, differing numbers of pistons may be used.

In conjunction with this buoyancy control system, an adaptive controller provides a programmable control of the system buoyancy so that the platform may be cycled in an ascent and descent mode at controlled speeds, either along a mooring line or free-drifting. The adaptive control may be responsive to various ocean characteristics outside the platform, such as may be detected by sensors for such parameters as pressure, temperature, salinity, and acoustic properties. Alternatively, the ascent and descent control signals may be generated on a time basis. The control in some forms of the invention may be a programmed microprocessor.

1. GENERAL DESCRIPTION

Figure 1:
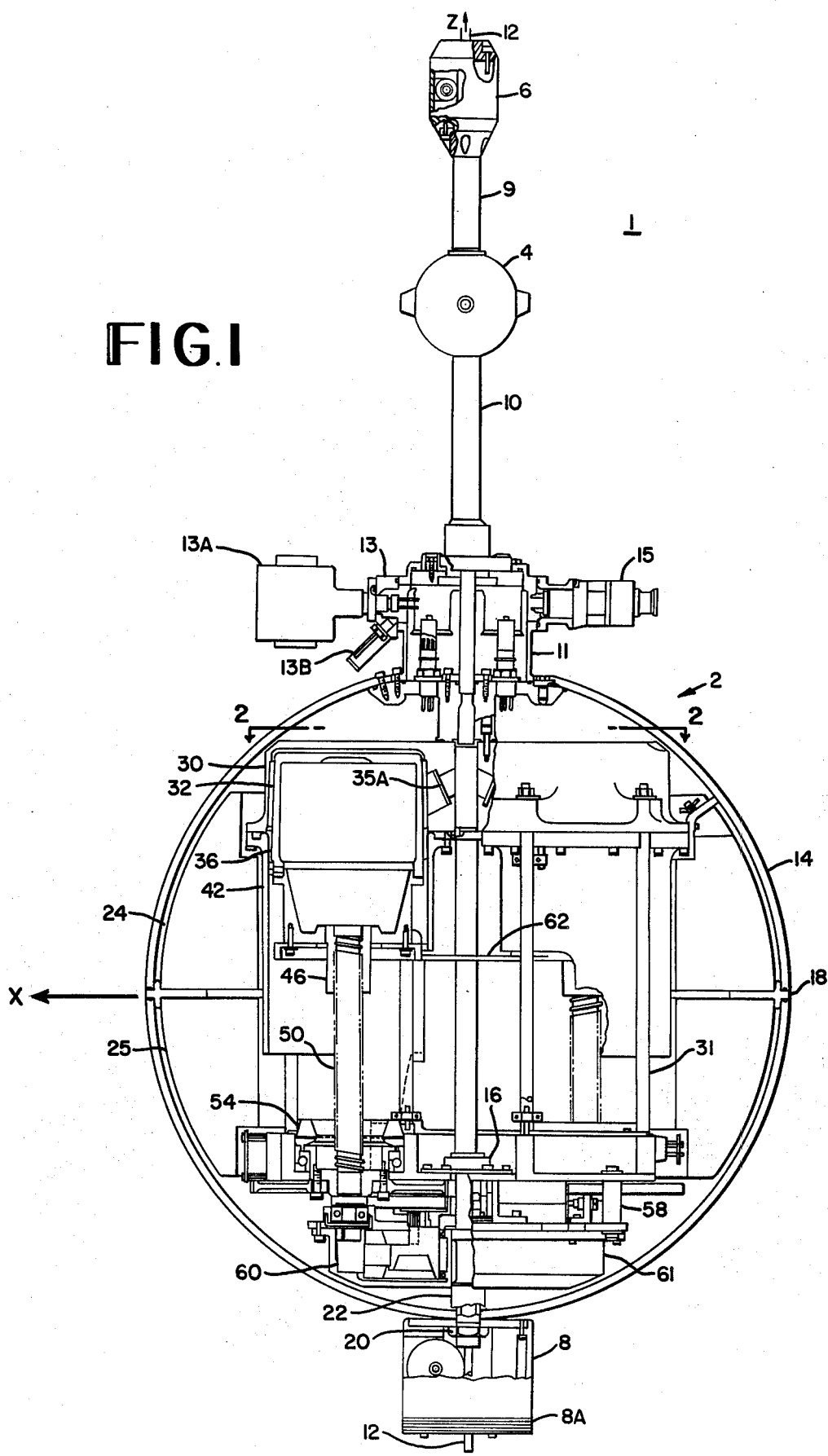
FIGS. 1 and 2 show, partially in cutaway form, an exemplary embodiment of the present invention.
Figure 2:
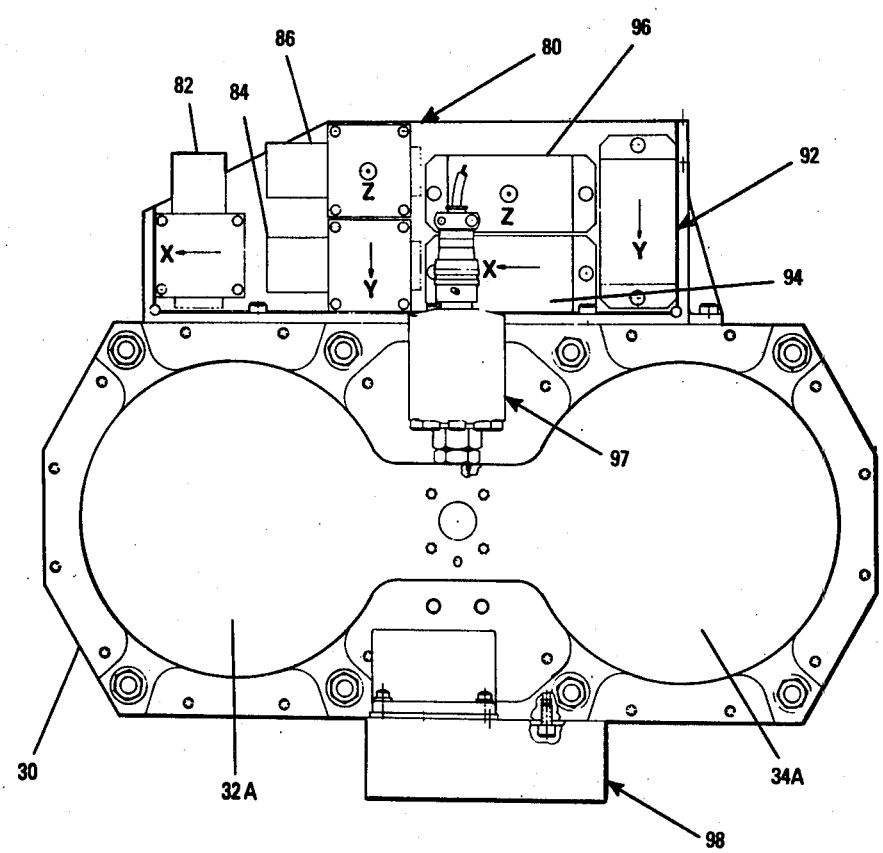

FIGS. 1 and 2 show the general assembly for the ocean characteristic monitoring system 1 of the present invention, shown in reference to a cartesian coordinate system, with the X and Z axes being shown in FIG. 1. The system 1 is shown in conjunction with a mooring line 12 passing along its central (Z) axis. In alternative embodiments, the system 1 may be free floating, i.e. adapted for operation without tracking a mooring line. In the present embodiment, structural members and fasteners which interface seawater are fabricated from titanium because of that material's characteristic high strength-to-weight ratio and good corrosion resistance to seawater. The housings of commercial external sensors are fabricated from type 316 stainless steel. Internal parts not exposed to seawater are made of aluminum or high strength steel.

Generally, the system 1 includes a spherical (56 cm diameter, 0.64 thick) instrumentation housing 2, and a spherical (10 cm diameter) electromagnetic current sensor assembly 4. In this embodiment, the current sensor 4 is rigidly coupled to the adjustable buoyancy housing 2. The sensor 4 is substantially free to move in the Z direction. Thus, axial motion of the mooring line 12 excited by a surface buoy, for example, is uncoupled from the sensor 4. In addition wave field pressure gradients which force oscillatory water particle motion, also force oscillatory motion of system 1 along the line 12 axis. As a result of the system axial freedom, however, the current sensor 4 sees only a small oscillatory flow component along the Z axis, and this oscillatory component is superimposed upon the larger steady component due to the ascent or descent speed of system 1. Consequently, the current flow measurements provided by sensor 4 are substantially independent of the surface wave field.

The spherical housing 2 and current sensor 4 include a conduit (1.0 cm diameter) along their polar (Z) axis which serves as a guide for the mooring line 12. Additionally, this conduit provides a path to the ocean for water ingested or expelled by the buoyancy control system (described more fully below). Roller assemblies 6 and 8 are positioned at the upper and lower ends, respectively of system 1, to provide tracking along a mooring line 0.7 cm diameter) with minimal frictional resistance.

The current sensor 4 is coupled to the upper roller assembly 6 by extension tube 9 and is coupled to a cylindrical header housing 11 by extension tube 10. The lower roller assembly 8 is directly coupled to the spherical housing 2.

The cylindrical header housing 11 couples the spherical housing 2 and the extension tube 10. Housing 11 isolates the housing 2 from possible water leaks into the current sensor 4 and provides a mount support for a sensor package 13, including an induction coil conductivity sensor 13A and a thermistor temperature sensor 13B, as well as a test plug 15 and an acoustic transducer (not shown) for underwater communication. In operation, the test plug and acoustic transducer are covered by a molded cap having the same shape as the sensor assembly 13 so that the system 1 is hydrostatically and hydrodynamically symmetrical about the polar (Z) axis. The internal components of housing 2 are also arranged for mass symmetry about this axis so that the overall system has minimal torques about that axis, thereby avoiding spurious azimuthal rotations which might otherwise be excited by the surface wave field.

The spherical housing assembly 2 is made up of spherical hemisphere sections 14 and 16 joined by an equatorial plate 18. The sections 14 and 16 are held in place by a preload nut 20 which compresses the portions 14 and 16 against an equatorial O-ring seal on plate 18. The nut 20 is tightened against a central post 22 which serves as the spine supporting internal components and also provides the conduit for the central mooring line 12. Battery packs 24 and 25 supply electrical power to system 1 and are connected to and supported by the equatorial plate 18.

In the present embodiment, the hemispheres 14 and 16 are spun titanium to produce a uniform grain structure with flow lines symmetrical to the Z axis. This grain structure reduces susceptibility to stress corrosion cracking. In other embodiments, alternative fabrication techniques may be utilized, such as explosive forming, forging, hydroforming, hot isostatic pressing and machining from a solid block.

A dual displacement piston assembly is positioned within the spherical housing 2. This system includes a pressure transducer 97 (shown in FIG. 2), a cylinder head 30, two displacement pistons 32 and 34, cylinder-to-conduit filters 35A and 35B, rolling diaphragm seals 36 and 38, cylinder skirts 42 and 44, ball nuts 46 and 48 and associated ball screws 50 and 52 and bumpers 54 and 56. Elements 34, 35B, 38, 44, 48, 52, 56 are not shown in FIG. 1.

The dual displacement piston assembly also includes a gear box 58, piston position encoder 99 (see FIG. 3) and a d.c. torque motor 60 within housing 61 (shown cut away in FIG. 1.) A torque equalization plate 62 couples the motion of the pistons 32 and 34.

FIG. 2 shows the cylinder head 30 of the present embodiment. Head 30 is fabricated from titanium and includes bores 32A and 34A for the pistons 32 and 34, respectively. A flow passage connects these bores to the axial conduit in central post 22 for providing flow paths for the drawing in or expelling of water in response to the motion of displacement pistons 32 and 34. The filters 35A and 35B prevent solid particles from contacting and damaging the rolling diaphragms 36 and 38. Rolling diaphragms 36 and 38 provide a seal between the cylinder provided by the pistons and bores and the interior of the remainder of the interior region of housing 2. Diaphragms 36 and 38 in the present embodiment are made from a fabric membrane impregnated with an elastomeric sealant. In the present embodiment, the rolling diaphragms are type no. 3-555-444 FCJ, manufactured by Bellowfram, Burlington, Mass. These diaphragms permit a smooth, continuous near-frictionless piston motion. Also, the diaphragms isolate the aluminum pistons 32 and 34 from the corrosive effects of seawater.

The pressure transducer 97 is also mounted on the cylinder head 30, and measures pressure at the axial conduit. The cylinder head 30 also provides mounting for an attitude reference package 80 (described below) and tape recorder 98.

The pistons 32 and 34 are driven with ball-screw and ball-nut assemblies (elements 46, 48, 50 and 52). The two ball screws have opposite hand threads, and the ball nuts are coupled with a torque-equalization plate 62, so that the reaction torques which would have been transmitted to the housing 2 are cancelled. The ball screws are steel and are one inch in diameter with ¼ inch lead.

The ball screws are driven by the d.c. torque motor 60 through gear box 58 having a two-pass spur gear train. An idler gear is placed between two gears to provide the counter-rotations of the ball screws. The gear box 58 is composed of two aluminum plates coupled with four posts and spacer sleeves, the upper plate minimizes distortions since the piston axial reaction force is applied to the upper gear-box plate. The aluminum torque motor housing 61 is taper pinned and screwed to the lower gear-box plate. Eight steel tie rods (exemplified by rod 31 in FIG. 1) are used to couple the gear box 58 and motor assembly 60 to the cylinder head 30. The gear box 58 also houses a gear-driven piston-position encoder 99 (shown in FIG. 3).

In the present embodiment, system 1 rides up and down the mooring line 12 (which may be, for example, a plastic-jacketed wire rope) guided by roller assemblies 6 and 8 located at the ends of the system 1. Assemblies 6 and 8 include three rollers whose axes are oriented 120 degrees apart and are staggered along the polar axis to allow passage over raised bumps or other imperfections which may exist or develop on the mooring line 12. External ballast weights 8A are shown to be attached at the outboard end of the lower-roller assembly 8.

The high torque d.c. motor 60 is operated near its maximum efficiency, low load speed range. With this motor form, together with the large rolling diaphragm-sealed, low-friction piston assembly, a highly energy efficient operation is achieved. This combination avoids the large electrical loss and space mass requirements of a d.c.-a.c. conversion, and permits a low gear reduction ratio resulting in low gear losses and a simple gear train.

The system 1 is nominally neutrally buoyant, that is, for the total mass, the displacement is fixed (94 kilograms and 0.091 cubic meters for the present embodiment). The spherical housing 2 provides this displacement for minimum structural mass. The total water displacement capacity for the system 1 is 4080 cubic centimeters which provide for a 1 meter/second current and a drag coefficient of 0.6 with the following budget:

(1) 1170 cubic centimeters to provide for seawater density and volume changes, (2) 750 cubic centimeters to overcome friction, (3) 1500 cubic centimeters to overcome axially component of drag due to axial motion, and (4) 660 cubic centimeters to overcome the axial component of drag due to mooring line inclination.

The dual piston arrangement permits symmetrical balance packaging of the remaining components, and provides simple torque balance using one left-hand and one right-hand thread screw jack. Furthermore, the center of mass is maintained on the polar axis as water moves in and out of the cylinders.

The system 1 further includes an attitude reference package (ARP) 80 for providing signals to a control portion for resolving the body axes current components from the current sensor 4 into north and east components ARP 80. The attitude reference package 80 is positioned within the spherical housing 2 and coupled to the exterior of the cylinder head 30, as shown in FIG. 2. Two single axis magnetometers 82 and 84 provide the primary azimuth signals. These magnetometers are mounted with their input axes being orthogonal to the polar axis. A third magnetometer 86 is mounted with its sensitive axis parallel to the polar axis to provide a signal which is used in conjunction with the others to compensate for changes in the Earth's magnetic intensity vector encountered in moving the system 1 between various mooring sites.

Two single axis accelerometers 92 and 94 are mounted in ARP 80 with their input axes orthogonal to the polar axis. Accelerometers 92 and 94 provide tilt signals used to correct the primary magnetometer signals for that portion of the Earth's vertical magnetic intensity due to the tilt of the system 1. Magnetometers 92 and 94 are also used for resolving the current components into the horizontal plane when the tilt exceeds a predetermined value, such as 10 degrees. A third accelerometer 96 is mounted with its sensitive axis parallel to the polar axis.

An electronic and computer system 100 (ECS) is mounted in two sections on either side of the piston assembly within the housing 2. ECS 100 includes conditioning electronics for the sensors, power supplies, analog-to-digital conversion networks, microprocessor controller with associated memory and logic, incremental cassette tape recorder, motor controls, and test and operator equipment interface. The microprocessor controller provides programmable control of these overall systems providing current component resolution and smoothing, ascent and descent velocity control, profiling cycle control, parameter sampling rate and averaging internal control, and data formatting.

Generally, operation of the system 1 includes the following functions: sampling, processing and recording of data, and buoyancy control. These control functions are established under program control by the microprocessor controller. The method of operation will now generally be described (with more detailed description following below) by considering the various phases of a profiling cycle, starting at the bottom stop on the mooring line.

Assuming that the system 1 has been at rest at the bottom stop on the mooring line at a predetermined depth awaiting the next measurement cycle, ascent mode is initiated at an ascent start of launch, time which occurs at predetermined intervals. Since the required net buoyancy to achieve a given ascent speed is a function of the current, the system 1 first measures the average current, temperature and conductivity over a predetermined time interval (e.g. 1 minute). In this measurement, at intervals (e.g. 2 seconds), the current sensor, magnetometer, accelerometer, thermistor and conductivity transducer signals are periodically sampled, converted and processed to obtain average temperature conductivity and north and east current components.

The motor 60 is then energized to drive the pistons, Since the system 1 cannot predict liftoff in advance due to variations in seawater density, volume, friction and drag coefficients, and the like, the pressure is monitored by transducer 97 to detect liftoff. Following liftoff, the system buoyancy has a component along the mooring line just sufficient to balance the axial components of weight, friction and drag due to line inclination. The axial component of buoyancy (added by continuing to drive the pistons after liftoff) is balanced by the axial components of inertia forces and drag due to axial motion. A steady state ascent speed is a function of current and volume displacement of the pistons after detection of liftoff. This volume displacement is monitored by the piston position encoder 99. In the present embodiment, the ascent speed is related to current and volume displacement in accordance with the following rules: if the current is less than a predetermined value (e.g. 10 centimeters/second), the motor 60 is shut down as soon as liftoff is detected (by the pressure decrease by a predetected amount (e.g. 10 mbar)). The ascent speed stabilizes shortly thereafter to a nominal value (e.g. between 11 and 15 cm/s). If the magnitude of the current $\sqrt{U^2+V^2}$, where U and V are the orthogonal components of the current in the X-Y plane, is in a predetermined range (e.g. 10-50 cm/s), the motor 60 is shutdown when the piston displacement has increased by a predetermined amount, (e.g. $[6.2\sqrt{U^2+V^2}-26]$ cm$^3$ after liftoff detection. The ascent speed thereafter stabilizes to a normal value (e.g. between 12 and 14 cm/s). For currents greater than a predetermined value (e.g. 50 cm/s), the displacement required after liftoff is some different value, for example, $[8.1\sqrt{U^2+V^2}-110]$ cm$^3$, causing the speed to stabilize in a predetermined range (e.g. 12-14 cm/s). After shutdown, the detected bottom oceanographic characteristics and the piston position are recorded on the tape recorder 98. The program control maintains the ascent speed within a prescribed deadband, and records parameter averages within prescribed depth zones. Upon entering any zone, the program controller refers to its memory for the pressure depth to the top of the zone, the ascent speed deadband limits, and the parameter sampling requirements. By way of example, the top of the first zone after liftoff may be 160 dbar, the deadband limits 10 and 16 cm/s, and the sampling period two seconds. Upon entering this zone, the parameter averaging commences and the ascent speed monitoring is performed, with the speed monitoring being achieved by monitoring pressure periodically (e.g. every thirty seconds). Whenever the indicated ascent speed is outside the established deadband, a speed change to achieve a nominal ascent speed is calculated. From the value, a volume change required to accomplish this speed change is calculated. By way of example, the following rule may relate the volume and speed changes: the volume change equal $0.63\sqrt{U^2+V^2}$ times the speed change for currents greater than a predetermined value, (e.g. as 20 cm/s), or the volume change equals 12 times the speed change for current values less than or equal to 20 cm/s, where the current value used is the most recent average current.

The motor 60 is then energized long enough to drive the pistons 34 and 36 until the desired volume change has been measured by the piston position encoder 99. While the motor 60 is energized, the characteristic averaging task is suspended, avoiding magnetic interference from the motor. Ascent speed monitoring continues, but is disregarded until a predetermined period (e.g. 15 seconds) after motor shutdown to allow time for the ascent speed to stabilize. The above procedure is continued until the pressure reaches the pressure limit (e.g. 160 dbar) when the parameter averages and piston position are recorded.

Measurements in each succeeding zone are performed in the same manner. As the surface is approached, the zones might be made progressively thinner to account for the progressively shorter vertical scales anticipated. Accordingly, the nominal ascent speed may be proportionately decreased to ensure remaining in each zone long enough to average over many of the longest surface-wave periods. Gradual reduction of ascent speed tends to occur naturally without control action if the currents increase as the system 1 approaches the surface. Also, the sampling period may be progressively shortened (e.g. initially to one second, and finally to 0.5 second) near the surface to capture the progressively shorter period oscillations encountered in the surface wave field. Since the ECS 100 consumes more power at higher sampling rates, it is generally advantageous to utilize the slowest satisfactory rate.

In the preferred embodiment, the tap recorder is adapted to record as many as 87,600 sets of zone parameters, or 10 zones/cycle at 1 cycle/hour for 1 year. By way of example, an average ascent speed of 10 centimeters/second results in completion of the measurement phase of a cycle from a 200-meter depth to the surface 1n just over 30 minutes. This example permits a profiling frequency of 1 cycle/hour. With ten zones, the average time per zone is 200 seconds, long enough to average over many wave periods. Furthermore, the exemplary 10 centimeter/second ascent speed biases the relative flow to approach the current probe from the top hemisphere of its field of view. This bias enhances the current sensor 4 response by moving its turbulent wake downstream from its electrodes, and by positively keeping the sensor 4 out of the wake of the spherical housing 2. This biasing of the relative flow is maintained regardless of surface wave excitation.

The above described profiling-while-ascending operation provides space-time averages, while maintaining a high degree of energy conservation. Alternatively, the system 1 can be stopped to measure at fixed levels. In the latter forms, energy may be extracted from the sea pressure while retracting the pistons. Since the motor behaves like a generator when driven by the pistons, batteries in the battery pack may be recharged while the pistons are pushed down by the sea pressure.

The descent mode is commenced upon completion of the ascent mode. A dive is performed in a manner similar to that described for liftoff, resulting in the achievement of a descent speed calculated to arrive at the bottom well in advance of the next ascent start time. The descent mode is similar to the ascent mode, except that oceanographic characteristic sensing is suspended during descent. Upon arrival at the bottom, a rest mode keeps watch, preventing inadvertent ascent due to changing conditions, while awaiting the next ascent start time.

Table 1 provides the operating range, digital resolution (least significant bit), and the smallest errors expected to be achieveable for each of the parameters processed by the preferred embodiment (described in detail in the following sections).

2. BUOYANCY CONTROL SYSTEM

TABLE 1

| Parameter | Units | Range | LSB | Absolute Error (Short Term) | In-Situ Drift/Year |
|---|---|---|---|---|---|
| Current | cm s$^{-1}$ | −400 to 400 | 0.20 | >1.3, <3% of reading | 2 |
| Temperature | °C. | −5 to 35 | 0.0040 @ −5 0.033 @ 35 | 0.01 | 0.005 |
| Conductivity | mmho cm$^{-1}$ | 28 to 60 | 0.0078 | 0.01 | — |
| Pressure | d bar | 8 to 213 | 0.050 | 0.2 | 0.2 |
| Specific Force | gravity acceleration | −1 to 1 (x,y axes) 0 to 2 (z axis) | 0.00049 | 0.005 | 0.0005 |
| Magnetic Intensity | Earth's field at CSDL | −1.2 to 1.2 | 0.00059 | 0.01 | 0.0006 |
| Piston Displ. Vol. | cm$^3$ | 0 to 4360 | 1.06 | 1 | 0 |
| Recorded Time | s | 0 to 6.87 × 10$^8$ | 0.01 | — | 30 |

Figure 3:
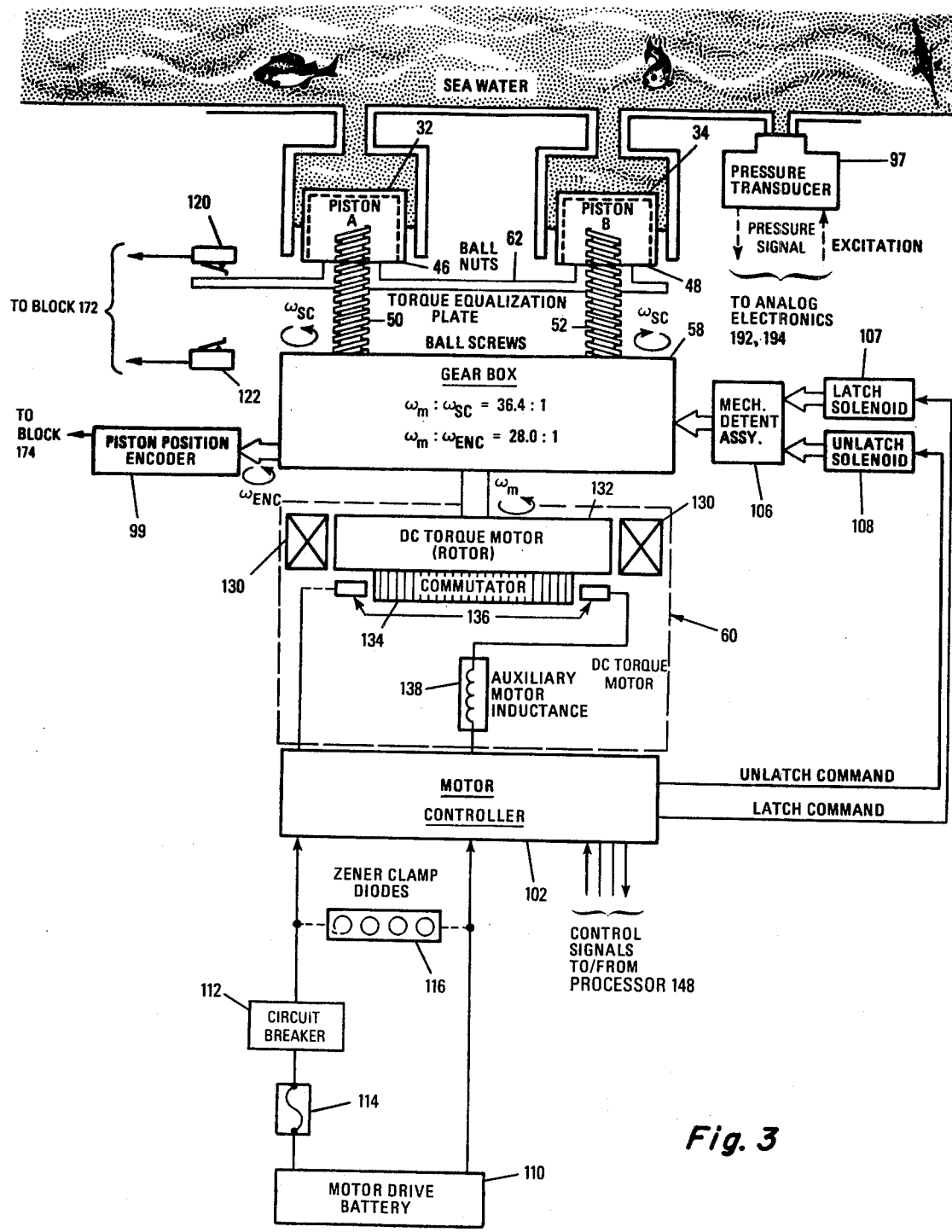
FIG. 3 shows, partially in block diagram form and partially in schematic form, the buoyancy control system for the embodiment of FIG. 1.

The buoyancy control system (BCS) is shown in schematic form in FIG. 3. The BCS provides open loop bi-directional current limited drive, and current limited dynamic braking for the dual displacement piston assembly. Primary control of the BCS is provided by a program controlled digital processor 148 (described in conjunction with ECS 100).

Generally, the buoyancy control system includes the pistons 32 and 34 is coupled by the ball nuts and ball screws (elements 46, 48, 50 and 52) and torque equalization plate 62 to the gear box 58 with the interior gear assembly. The gear assembly in box 58 is driven by the d.c. torque motor 60. Motor 60 is controlled by a microprocessor 150 (described below in conjunction with ECS 100) by way of motor controller 102. The motor controller 102 provides the directional drive signals for the motor 60 and, in addition, provides control signals to a mechanical control for the gear box 58 which includes a mechanical detent assembly 106 and associated latch solenoid 107 and unlatch solenoid 108. The directional drive and latch control signals from motor controller 102 are generated in response to control signals from the microprocessor 150 described below. The power supply for the BCS is provided by a motor drive battery 110 and associated control circuitry including circuit breaker 112, fuse 114, zener diode clamp network 116.

The torque equalization plate 62 travels between upper and lower limit switches 120 and 122, respectively, and provide relay trip control signals for a circuit breaker 112 when the plate 62 reaches predetermined extremes of motion within the housing 2. Switches 120 and 122 also provide electrical signals indicating these position limits to the processor 148. The gear box 58 also includes a mechanical coupling to the piston position encoder 99 which in turn is coupled to an interface in the processor 148. The pressure transducer 97 is electrically coupled to the analog electronics (described below in conjunction with ECS 100) so that an excitation signal triggers a response pressure signal representative of the pressure at sampling times.

In the present embodiment, the d.c. motor 60 includes a permanent magnet stator 130, loader 132, commutator 134 and brushes 136, together with an auxilliary motor inductance 138. In response to motor 60, the ball screws 50 and 52 rotate in opposite directions at an angular velocity having magnitude $w_{SC}$, the piston position encoder 99 input shaft rotates at angular velocity $w_{ENC}$ and the output angular velocity for motor 60 is $w_m$. In the present embodiment, the following relationships are utilizes:

$$w_m : w_{SC} = 36.4 : 1$$

$$w_m : w_{ENC} = 28.0 : 1$$

In the present embodiment, the motor 60 is a permanent magnet d.c. torque motor, model 7202 with winding designation T-7202-N, manufactured by the Inland Motor Division of Kollmargen Corporation. This configuration gives a peak torque at 11 ft./lb. at 38.4 nominal armature voltage at 8.7 amps. In alternative configurations, other motors, of course, may be utilited. The present embodiment utilizes an armature voltage of 41.8 volts for a nominal sea pressure of 300 lb./in. The system provides a mechanical gear-train efficiency of 77.6%, with a motor-to-ball nut torque gain equal to 36.435:1, with the motor characteristic speed being 21.04 rad/sec with a current of 1.7 amps and motor efficiency of 75.8%. The overall drive system efficiency is 58.8%.

In operation, as described more fully below, the processor 148 dedicates four output lines for transferring control signals to motor controller 102: bit 8 (detent release, or unlatch), 9 (detent apply, or latch), 10 (drive motor on) and 11 (drive motor up or brake). In response to these output control signals, the motor controller 102 enters one of four states: (1) all elements "off", (2) brake applied, (3) drive motor up, (4) drive drive down. The motor controller 102 is a decoding network for four output bits (bits 8–11) of processor 148 to provide outputs on the control lines going to the motor 60 and to control lines going to solenoids 107 and 108. These states are decoded to control the motor 60 to be off, brake drive up or drive down. In addition the solenoids 107 and 108 are controlled to be in one of the following states: (1) both off, (2) solenoid 107 on, and 108 off (latching the pistons), (3) solenoid 107 on and 108 off (unlatching the pistons).

The mechanical detent assembly 106 is a pawl-detent mechanism used as a mechanical detent to hold the piston position once a desired position is reached. This mechanism is a mechanical latching device in both the detent and non-detent positions. Assembly 106 is cogging (i.e. detent unlatch unnecessary) for piston drive outward (uP) but self-jamming (detent unlatch required for disengagement) for piston drive inward (down).

3. SENSORS

The sensors in the system 1 provide four groups of functions. The first group determines the characteristics of norizontal water transport. In this group, the following characteristics are measured:
  current (flow density)
  system azimuth
  system tilt
  vertical velocity
In operation, data derived from this functional group of operations is processed simultaneously.

The second functional group of measurements provides indication of the ocean salinity. In this group, the following characteristics are measured:
  electrical conductivity
  external temperature
  pressure The third functional group of measurements provide an indication of condftions inside the system of housing 2 of the system 1. In this group, the following characteristics are measured:
  internal temperature
  humidity The forth group provides data necessary for buoyancy control. In this group, the following characteristics are measured:
  pressure (depth and depth rate)
  shaft encoder (piston position)

In the present embodiment, the sensors for the first group of measurements are current sensor 4 and the attitude reference package (ARP) 80 (including the magnetometers and accelerometers). The current sensor 4 is a Marsh McBirney model 555 spherical electromagnetic current meter. This sensor is a two axis device adapted in system 1 to measure flow in a plane normal to the mooring line 12 passing through the center of the probe. The sensor 4 in the present embodiment is specially adapted to provide a through-tube, allowing the mooring line 12 to pass through the center.

In ARP 80, the accelerometers 92, 94 and 96 are force-balanced servo accelerometers consisting of a pendulum constantly restored to a normal position by a high-grain servo loop. The input axis is normal to the arm of the pendulum, and the internal servo loop restores the seismic mass of the pendulum to a null position with a torque motor proportional to current. In the present embodiment, the accelerometers are Columbia model SA701 forced balanced units for the horizontal axes, and model SA107 for the vertical axis. The magnetometers are Infinetics model MK-2b single axis magnetometers.

The sensors for the second group of measurements are conductivity sensor 13A, temperature sensor 13B and pressure Transducer 97. The conductivity 13A is a Plessey inductively coupled conductivity probe, type 2600-3 sensor head (with circuit board 5590). The thermal sensor 13B is a Fenwall termistor probe, outline H65, fit to iso curve +0.5%, 0 to +35 C. The pressure transducer 97 is a BLH Type DHF bonded strain gauge pressure transducer.

The sensors for the third group of measurements are an internal thermal sensor (not shown) and a humidity sensor (not shown), both being positioned within housing 2. The internal thermal sensor is a Fenwall Model 100K iso curve oceanographic thermfstor in a H-76 housing. The humidity sensor is a Phys-Chemical Research Corporation Model PCRC-11 humidity sensor.

The sensors for the fourth group of measurements are the pressure transducer 97 and piston position encoder 99. Encoder 99 is a Litton Industries absolute position encoder, model GCC-11-13P7.

4. ELECTRONICS AND COMPUTER SYSTEM

Figure 4:
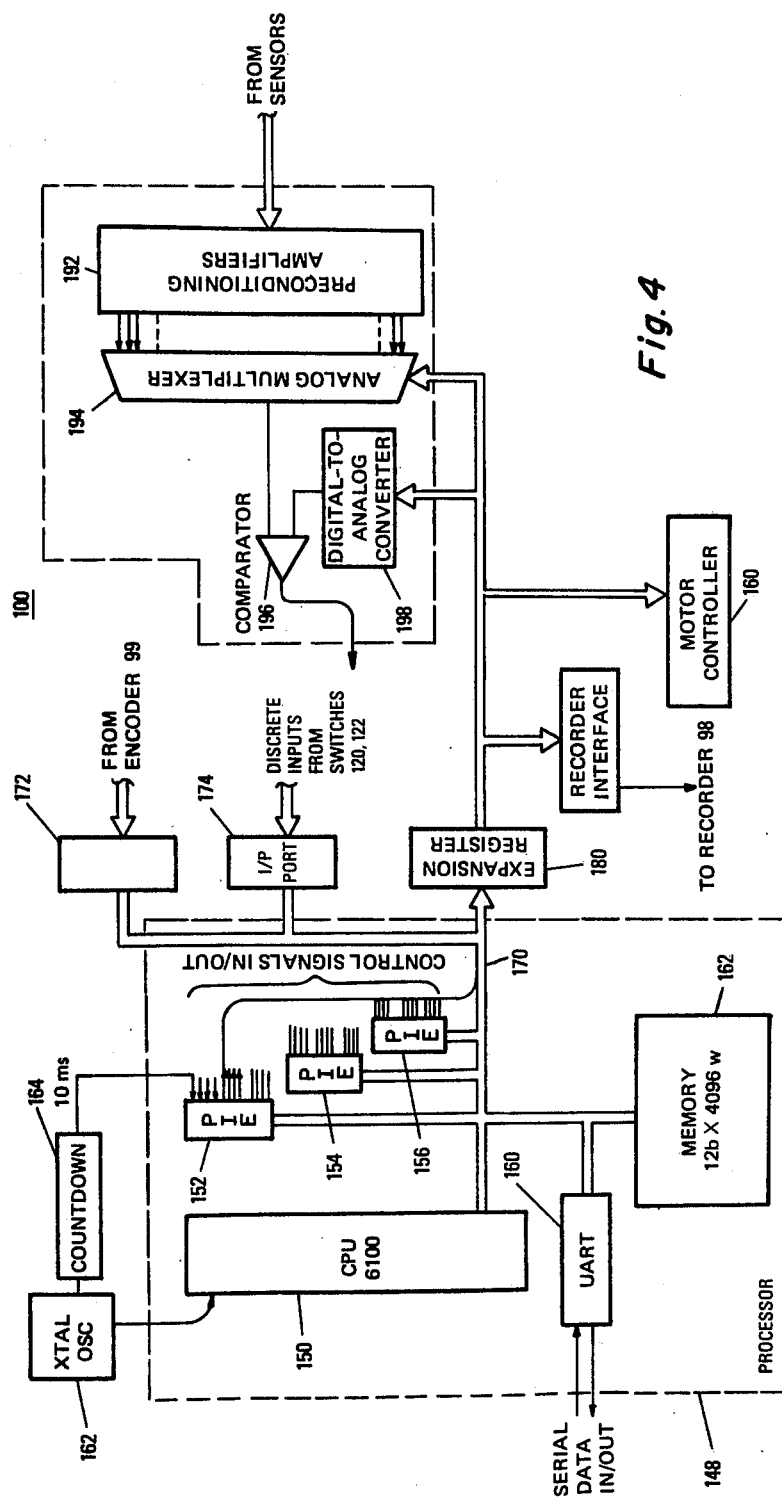
FIG. 4 shows in block diagram form, the electronics and control system (ECS) for the embodiment of FIG. 1.

The Electronics and Computer System (ECS) 100 is shown in block diagram form in FIG. 4. ECS/100 provides the following functions:

(1) Conditioning, selection, and conversion of analog sensor signals,
(2) Data formatting for recording,
(3) Timing and sequencing for all operations,
(4) Voltage regulation and switching of sensor power,
(5) Motor control,
(6) Computational capability for filtering,
(7) Component resolution and buoyancy control, and
(8) Interfaces for communication with external equipment.

In the present embodiment, the digital processor 148 of ECS 100 includes five CMOS large-scale-integrated circuits: 12-bit microprocessor (CPU) 150 (Intersil IM 6100), parallel interface elements 152, 154 and 156 (Intersil IM 6101), a universal asynchronous receiver/transmitter (UART) 160 (Intersil IM 6402) and an associated 12-bit, 4096 word memory 161.

A crystal oscillator 162 operating at 819.2 kilohertz drives a single 14-stage binary counter 164, producing timing signals and an interrupt to the interface element 152 at 10-millisecond intervals for timekeeping purposes. The same oscillator 162 provides clock pulses to the CPU 150. The parallel interface elements (PIE's) 152, 154 and 156 provide control signals to gate data between the processor 148 and the other elements of the system 1, including motor control 160. Data transfer takes place on the three-state 12-bit 'DX' bus 170. The PIE's 152, 154 and 156 also provide sense inputs which may be tested by program, or may be used to implement a full-vectored interrupt mechanism.

In the present embodiment, the UART 160 provides serial communication with external devices, such as a teletypewriter, and an acoustic data link. The bit rate is established by an externally applied clock, allowing interfacing to devices of various speeds without requiring internal changes.

Two 12-bit parallel input ports 172 and 174 are provided: one port 172 is dedicated to the piston position encoder 99, and port 174 is coupled to discrete logic signals from the limit switches 120 and 122.

Output from the processor 148 to the remainder of the ECS 100 is via a single register, denoted the expansion register 180. With this configuration, the loading on the DX lines in bus 170 is minimized and the number of transitions at the inputs to the various output registers is reduced while the DX lines in bus 170 change state many times during each instruction (for example, the bus 170 may carry the instruction address, the instruction, a memory address, and then data). The output of the expansion register 180 changes only when an output operation takes place.

The recorder 98 of system 1 includes a Sea-Data model 610 serial digital stepping recorder and a recorder interface 184. This device records 800 4-bit characters per inch on standard 0.15-inch cassettes, giving a total capacity of 9.2×10 bits for 100-bit records with appropriate synchronizing gaps.

Figure 5:
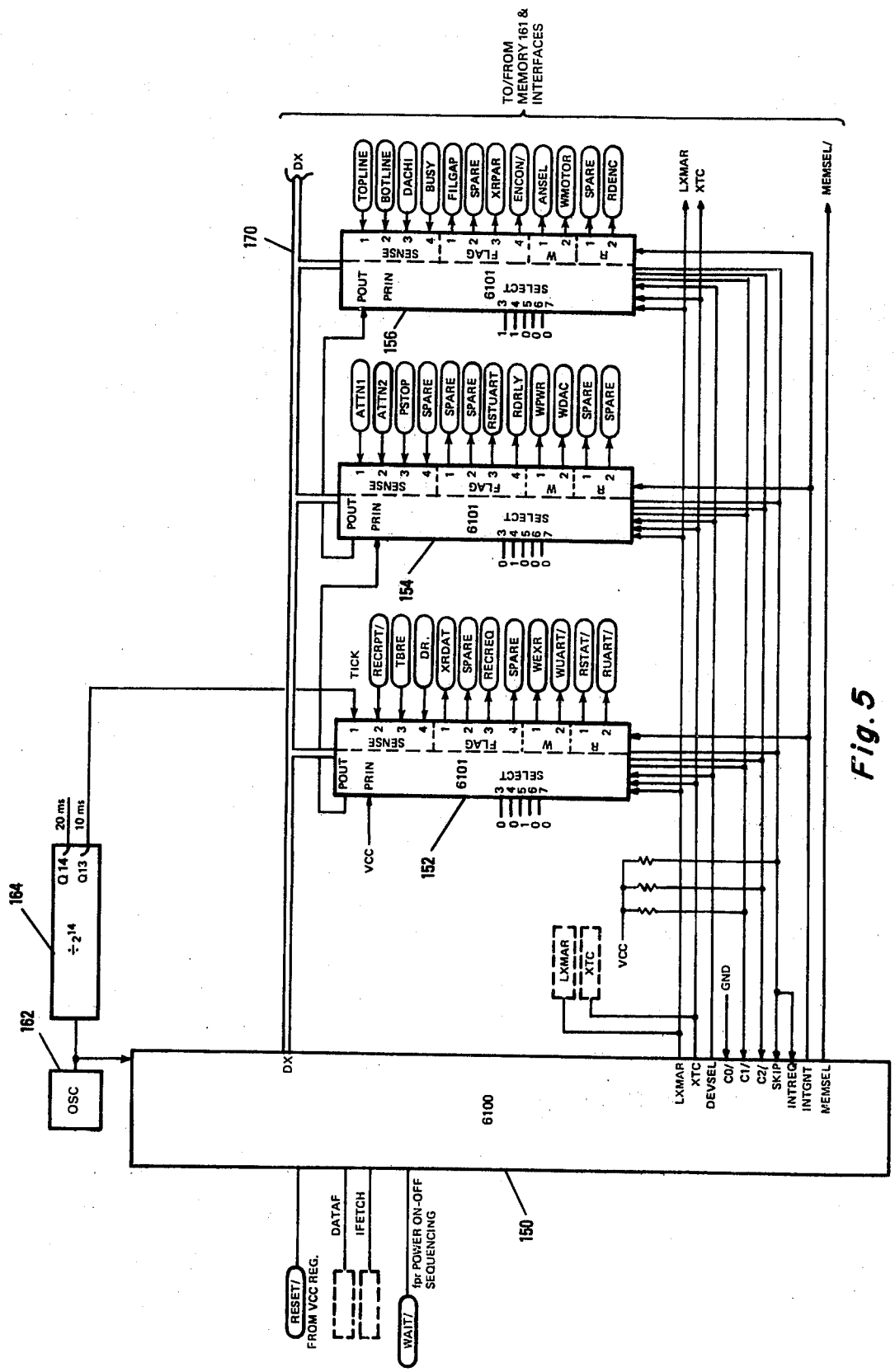
FIG. 5 shows in detailed block diagram form, the digital processor of the ECS of FIG. 4.

Details of the processor-PIE interconnections are shown in FIG. 5. Each PIE produces two read control signals, two write control signals, and four flags under program control. Each PIE also provides four sense inputs, which may be tested by skip instructions or may be used to drive the processor interrupt line. The functions of the PIE signals are listed in Table 2.

The CPU 150 executes the instruction set of the Digital Equipment Corporation PDP-8/E minicomputer. The normal instructions are described in Intersil IM6100 CMOS FIGS. 7A–7I. For the entries in Table 3, the octal machine code for each instruction is given, followed by the mnemonic and the operation performed. Ac is the accumulator, XR is the expansion register, and V indicates the logic 'OR' operation.

As described in conjunction with FIG. 3 the motor controller 102 provides the functions of driving the motor 60 in its forward, reverse, and dynamic braking modes, and also driving the detent (latch and unlatch) solenoids 107 and 108. Commands are transferred to the controller 160 from the expansion register 180 by the signal RWMOTOR which occurs when a write motor (WMOTOR) input-output instruction is executed. Bit assignments are as follows:

Bit 8—unlatch
Bit 9—latch
Bit 10—drive up

Table 2

| PIE Address (Octal) | PIE Signal | Signal Name | Use |
|---|---|---|---|
| 04 | S1 | TICK | 10-ms signal from timer. |
| 04 | S2 | RECRPT/ | 12-bits-taken signal from recorder. |
| 04 | S3 | TBRE | UART transmitter ready for character. |
| 04 | S4 | DR | UART receiver has new character. |
| 04 | F1 | XRDAT | Strobe recorder data register. |
| 04 | F2 | Spare | |
| 04 | F3 | RECREQ | Recorder initiate pulse. |
| 04 | F4 | Spare | |
| 04 | W1 | WEXR | Strobe expansion register. |
| 04 | W2 | WUART/ | Strobe UART transmitter buffer register. |
| 04 | R1 | RSTAT/ | Gate discrete inputs to DX. |
| 04 | R2 | RUART/ | Gate UART receiver to DX. |
| 10 | S1 | ATTN1 | Signal representong state of ATTN1 relay input. |
| 10 | S2 | ATTN2 | General-purpose input discrete. |
| 10 | S3 | PSTOP | Piston at limit. |
| 10 | S4 | Spare | |
| 10 | F1 | Spare | |
| 10 | F2 | Spare | |
| 10 | F3 | RSTUART | Drives UART reset input. |
| 10 | F4 | RDRLY | Not used. |
| 10 | W1 | WPWR | Strobe power-control register. |
| 10 | W2 | WDAC | Strobe digital-to-analog converter latch. |
| 10 | R1 | Spare | |
| 10 | R2 | Spare | |
| 14 | S1 | TOPLINE | Optional input for top-of-line sensor. |
| 14 | S2 | BOTLINE | Optional input for bottom-of-line sensor. |
| 14 | S3 | DACHI | Output of analog comparator. |
| 14 | S4 | BUSY | Tape recorder busy signal. |
| 14 | F1 | FILGAP | Tape recorder file gap command (not used). |
| 14 | F2 | Spare | |
| 14 | F3 | XRPAR | Shift recorder parameter register. |
| 14 | F4 | ENCON/ | Bias to encoder common. |
| 14 | W1 | ANSEL | Strobe analog multiplexer input latch. |
| 14 | W2 | WMOTOR | Motor controller input strobe. |
| 14 | R1 | Spare | |
| 14 | R2 | RDENC | Gate encoder to DX. |

Note:
S: sense,
F: flag,
R: read,
W: write.

12-bit Microprocessor, Intersil, Inc., August 1975.

Figure 6:
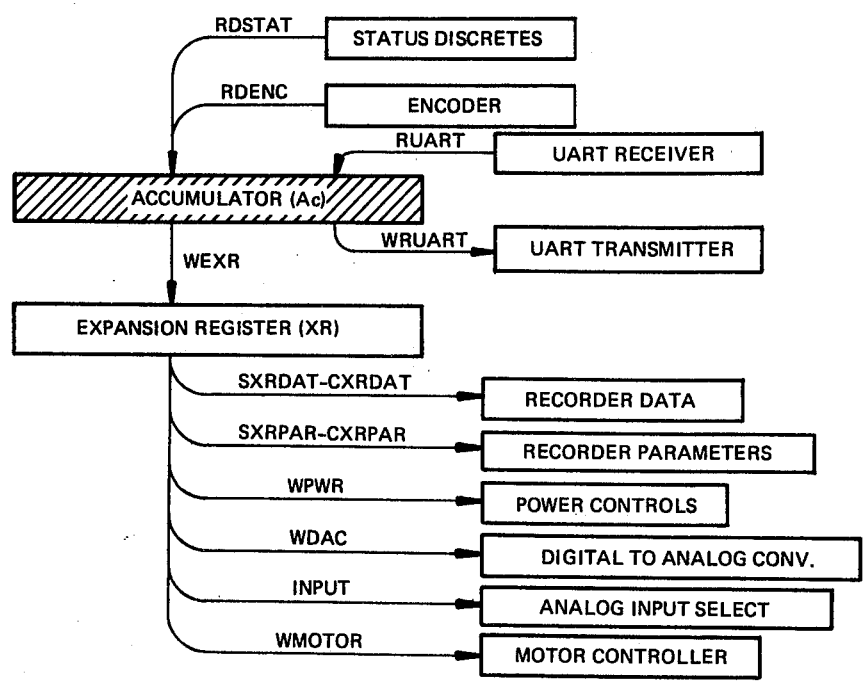
FIG. 6 illustrates the data flow in the ECS of FIG. 4.
Figure 7A:
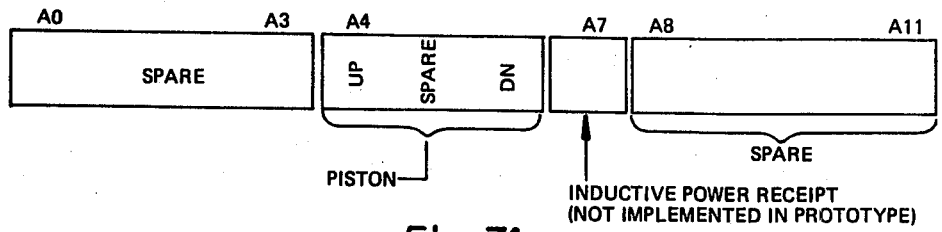
Figure 7B:
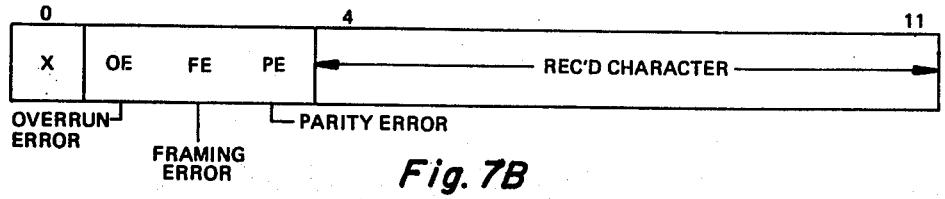
Figure 7C:
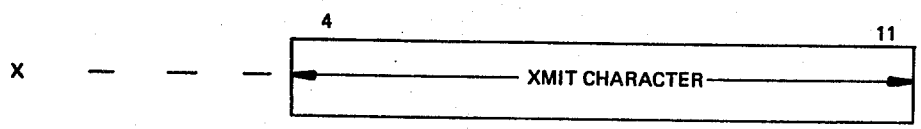
Figure 7D:
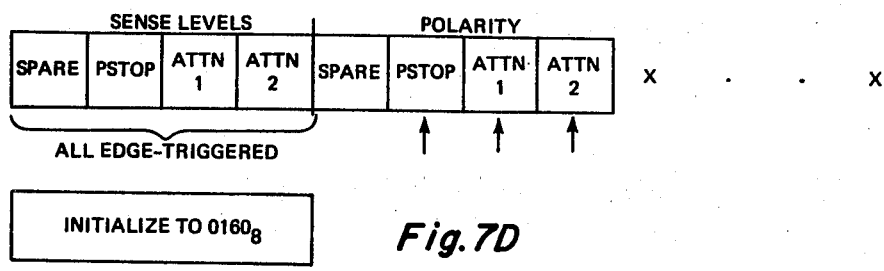
Figure 7E:
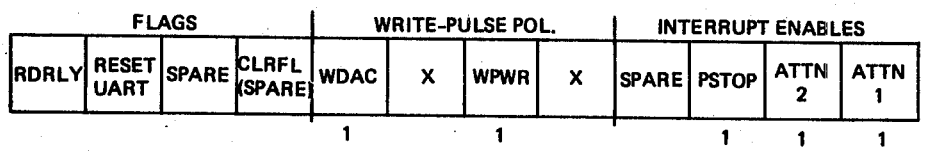
Figure 7F:
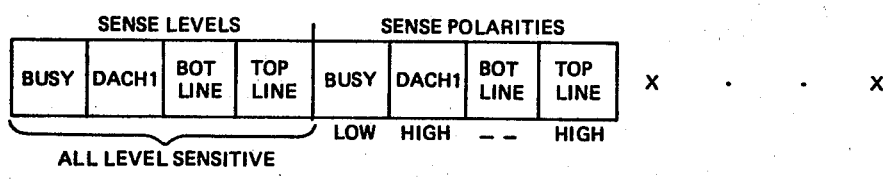

Interconnection of the CPU 150 and PIEs 152, 154, and 156 results in additional input/output-transfer (IOT) instructions specific to the present system. An overview of the ECS 100 data flow is shown in FIG. 6. Table 3 sets forth the special input/output instructions, with references to the instruction format illustrated in Bit 11—drive down
If bit 8 is one, voltage is applied to the solenoid 108 that releases the detent; if bit 9 is one, voltage is applied to the solenoid 107 that applies the detent. The four states that may be specified by the two bit word formed by bits 10 and 11 are:

TABLE 3

| | | | |
|---|---|---|---|
| 6100 | RDSTAT | Ac V STATUS DISCRETES → Ac | (FIG. 7A) |
| 6110 | RUART | Ac V SERIAL RECEIVER → Ac | (FIG. 7B) |
| 6111 | WRUART | Ac → SERIAL XMTR INITIATE | (FIG. 7C) |
| 6112 | SKPTBE | SKIP IF SERIAL XMTR READY FOR A CHARACTER | |
| 6113 | SKPDR | SKIP IF NEW SERIAL CHARACTER RECEIVED | |
| 6101 | WEXR | ACCUMULATOR → EXPANSION REGISTER | |

TABLE 3-continued

| | | | |
|---|---|---|---|
| 6106 | SXRDAT | ⎫ SEQUENCE TRANSFERS EXPANSION REGISTER | |
| 6107 | CXRDAT | ⎭ TO RECORDER DATA REGISTER, RESETS RUPT COUNTER | |
| 6316 | SXRPAR | ⎫ SEQUENCE SHIFTS RECORDER DATA REG. BIT 11 | |
| 6317 | CXRPAR | ⎭ INTO RECORDER CONTROL REGISTER | |

IF DO SXRDAT FIRST, THEN THIS SEQUENCE SHIFTS BIT 11 OF EXPANSION
REGISTER INTO PARAMETER REGISTER

| | | | |
|---|---|---|---|
| 6215 | WCRB2 | Ac → PIE2 CONTROL REG. B | |
| 6205 | WCRA2 | Ac → PIE2 CONTROL REG. A | (FIG. 7D) |
| 6204 | HCRA2 | Ac ← PIE2 CONTROL REG. A V Ac | (FIG. 7E) |
| 6315 | WCRB3 | Ac → PIE3 CONTROL REG. B | (FIG. 7F) |
| 6305 | WCRA3 | Ac → PIE3 CONTROL REG. A | |
| 6304 | RCRA3 | Ac ← (PIE3 CONTROL REG. A) V Ac | (FIG. 7G) |
| 6116 | SRREQ | ⎫ SEQUENCE PRODUCES "RECORD REQUEST" | |
| 6117 | CRREQ | ⎭ PULSE TO RECORDER | |
| 6306 | SFLGAP | ⎫ SEQUENCE PRODUCES "FILE GAP REQUEST" | |
| 6307 | CFLGAP | ⎭ PULSE TO RECORDER (WHICH IS IGNORED) | |
| 6102 | SKIPTK | SKIP IF TIME TICK HAS RISEN | |
| 6103 | SKIPRR | SKIP IF RECORDER INTERRUPT HAS RISEN | |
| 6202 | SKIPA1 | SKIP IF ATTN1 HAS RISEN | |
| 6203 | SKIPA2 | SKIP IF ATTN2 HAS RISEN | |
| 6212 | SKIPPS | SKIP IF PSTOP HAS RISEN (PISTON AT STOP) | |
| 6302 | SKIPTL | SKIP IF TOP-OF-LINE SENSOR − 1 | |
| 6303 | SKIPBL | SKIP IF BOTTOM-OF-LINE SENSOR = 1 | |
| 6312 | SKIPDH | SKIP IF COMPARATOR SAYS DAC > INPUT | |
| 6313 | SKBUSY | SKIP IF TAPE RECORDER NOT BUSY | |
| 6201 | WPWR | XR → POWER CONTROLS | |
| 6211 | WDAC | XR → DIGITAL-TO-ANALOG CONVERTER | |

CODE IS OFFSET BINARY, i.e.

```
0  1  2  3  4  5  6  7  8  9  10  11
0  0  .  .  .  .  .  .  .  .  .    0   → −10 V
1  0  .  .  .  .  .  .  .  .  .    0   →   0 V
1  1  1  .  .  .  .  .  .  .  .    1   → +10 V
```

| | | |
|---|---|---|
| 6311 | WMOTOR | XR → MOTOR CONTROLLER |

ENCODER IS POWERED WHEN FLAG 4 OF CONTROL REG. A OF PIE3 IS 0.

ENCODER IS UNPOWERED WHEN FLAG 4 OF CRA OF PIE3 IS 1.
ACCESSED VIA WCRA3 AND RCRA3.

| | | | |
|---|---|---|---|
| 6310 | RDENC | ENCODER V Ac → Ac | |
| 6301 | INPUT | XR → ANALOG INPUT SELECT | |
| 6216 | SMR | ⎫ PULSES MASTER RESET LINE TO UART | |
| 6217 | CMR | ⎭ AT TURNON OR TO CLEAR ERROR BITS | |
| 6114 | WVR1 | Ac → VECTOR ADDRESS FOR RUPTS ON PIE 1, i.e., TICK, RECRPT, UART TBRE, AND UART DR | |
| 6214 | WVR2 | Ac → VECTOR ADDRESS FOR RUPTS ON PIE 2, i.e., ATTN1,ATTN2,PSTOP | |
| 6314 | WVR3 | SETS VECTOR ADDRESS FOR PIE3(TOP & BOTTOM OF LINE,DACHI, TR BUSY) IT IS ANTICIPATED THAT THESE THESE WILL NOT INTERRUPT THE PRECESSOR) | |
| 6115 | WCRB1 | Ac → PIE 1 CONTROL REGISTER B | (FIG. 7H) |
| 6105 | WCRA1 | Ac → PIE 1 CONTROL REG. A | |
| 6104 | RCRA1 | Ac ← (PIE 1 CONTROL REG. A) V Ac | (FIG. 7I) |

| Word | |
|---|---|
| 00 | Motor drive off (minimum power in controller). |
| 01 | Apply current-limited dynamic braking to motor. |
| 10 | Drive motor in down direction. |
| 11 | Drive motor in up direction. |

Figure 8:
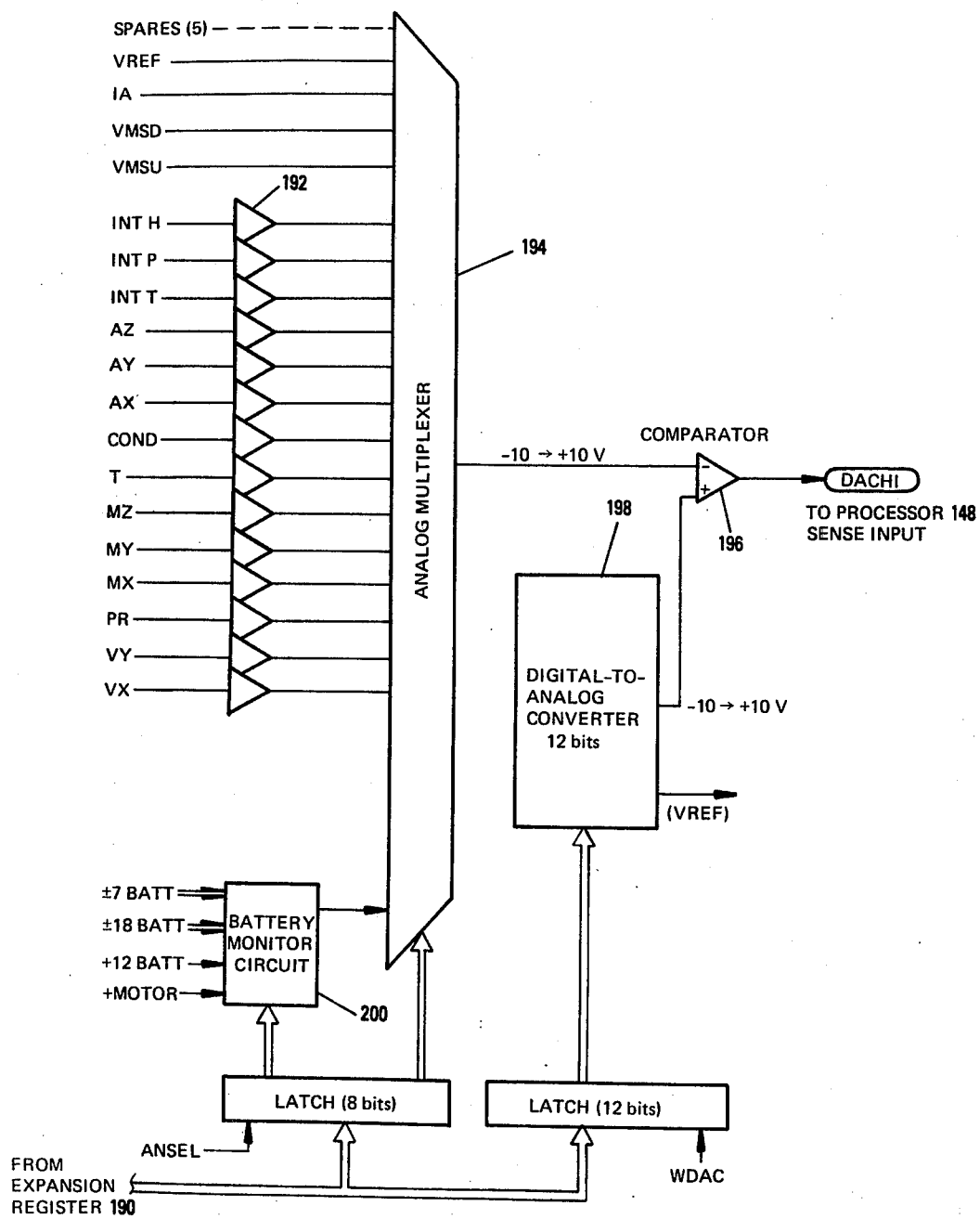
FIG. 8 shows in detailed block diagram form, the analog portion of the ECS of FIG. 4.

A detailed block diagram of the analog portion 190 of ECS 100 is shown in FIG. 8. Individual preconditioning and scaling amplifiers 192 associated with each input produce outputs that vary from −10 to +10 volts over the chosen sensor range. Table 4 shows the selection codes and design end points for the analog inputs to the ECS 100.

A single channel is selected via a 24-input analog multiplexer 194 and applied to a precision comparator 196 along with the output of a 12-bit digital-to-analog converter 198. The output from comparator 196 connects to a processor sense input (DACHI) which may be tested by program. Analog-to-digital conversion is accomplished by a successive-approximation routine resident in program memory.

Battery monitor circuit 200 permits the selection of an attenuated battery voltage cfor conversion, including the +MOTOR signal from the motor controller 102. The other three signals representing the motor behavior are brought to the multiplexer, as is the ECS 100 internal reference voltage which is obtained from the digital-to-analog converter 198.

5. PROGRAMMED MICROPROCESSOR

Table 4

| Select Code (Octal) | Symbol | Variable |
|---|---|---|
| XX01 | VX | X velocity |
| XX02 | VY | Y velocity |
| XX03 | PR | External pressure |
| XX04 | MX | X magnetometer |
| XX05 | MY | Y magnetometer |
| XX06 | MZ | Z magnetometer |
| XX07 | T | External temperature |
| XX10 | COND | Conductivity |
| XX11 | AX | X accelerometer |
| XX12 | AY | Y accelerometer |
| XX13 | AZ | Z accelerometer |
| XX14 | INT T | Internal temperature |
| XX15 | INT P | Internal Pressure |
| XX16 | — | — |
| XX17 | VMSU | Motor voltage 1 |
| XX20 | VMDSD | Motor voltage 2 |
| XX21 | IA | Motor current |
| XX22 | VREF | Reference 2.5 v |
| XX23 | — | — |
| XX24 | — | — |
| XX25 | — | — |
| XX26 | — | — |
| XX27 | — | — |
| X0XX | | |
| X100 | — | — |
| X200 | −18B | −18 v battery |
| X300 | −7B | −7 v battery |
| X400 | +12B | +12 v battery |
| X500 | +MOTOR | Motor battery |
| X600 | +18B | +18 v battery |
| X700 | +7B | +7 v battery |

A microprocessor 150 and associated memory 161 provide the overall control for system 1 so that the assent and decent rates may be precisely controlled without exact foreknowledge of the critical parameters of line tilt, local water density, mooring line friction and current velocity profile. All this is accomplished minimal interfering effects of wave induced motion. Furthermore, the system 1 provides output signals representative of the resolution of the ocean current in absolute north and east components so that all of the desired averages of these components are recorded. In performing this control function, the microprocessor 150 performs two primary functions during operation:

(1) ascent/descent rate and scheduling control, using pressure and current data and affected by motor-driven change of buoyancy.

(2) data gathering via datatizing of analog sensor outputs, processing and recording of that data.

Figure 9:
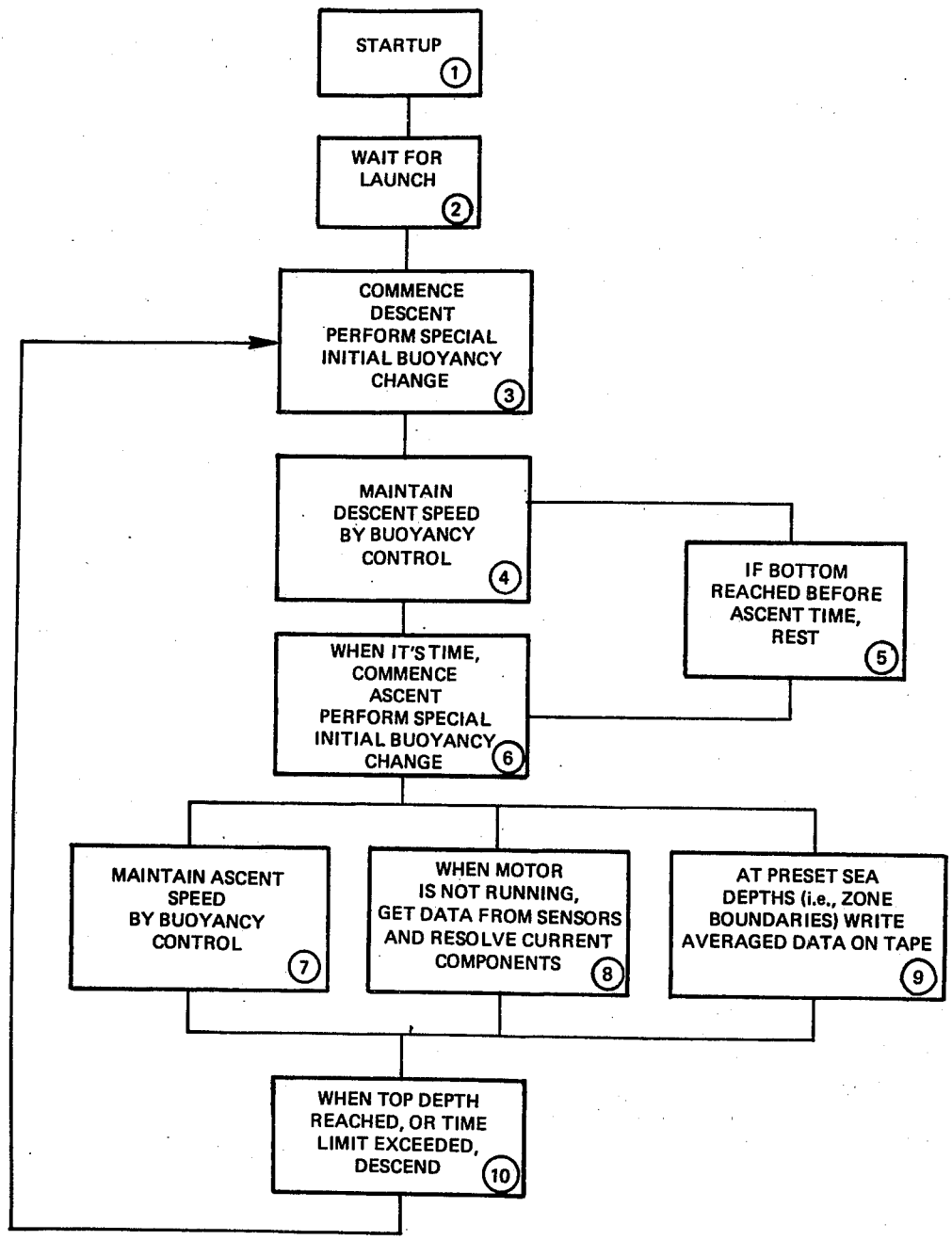
FIG. 9 shows in block diagram form, the tasks performed by the programmed microprocessor of the ECS of FIG. 4.

FIG. 9 shown in block diagram form the tasks performed by the programmed microprocessor 150. The encircled reference numerals in FIG. 9 relate to the following numbered paragraphs explaining the various subtasks.

1. Startup is initiated manually. Prior to startup, the clock and microprocessor 150 may be operating and most system functions may be exercised for test purposes.

2. System 1 remains dormant until a preset time and pressure are reached.

3. To commence descent (or ascent) the buoyancy motor runs until a defined displacement change has been obtained after leaving the upper (or lower) stop. This displacement is computed in real time, as a simple function of local current magnitude, and (descent only) of the time available before the next ascent.

4. Periodically, pressure is sensed, and adjusted ascent/descent rate of the system is calculated. If the system has had sufficient time to reach terminal velocity after the previous buoyancy change, then a decision is made as to whether or not further buoyancy change is necessary, based on whether the ascent/descent velocity is within specified limits. These limits may be changed for each zone during ascent; By way of example, typical values might be in the range 7 to 13 centimeters/second for ascent, or in the range −7 to −20 centimeters/second for descent. If buoyancy change is necessary, the amount, in piston-position encoder units, is calculated as a function of the desired speed change, the value and result of the last buoyancy change, and the local current magnitude.

5. The "bottom" is determined solely by pressure.

6. Same as paragraph 3 above. Ascent commences at predetermined times.

7. Same as paragraph 4 above. Typically, ascent may take 30 minutes.

8. Current, accelerometer, and magnetometer data are sensed frequency, e.g. every 0.5 to 4 seconds. All data is saved directly on the onboard tape recorder 98. In alternative embodiments, only zone averages of resolved current velocity components may be recorded.

9. At preset zones, i.e. pressures, time is determined and temperature, pressure, and conductivity are averaged, and recorded for each zone.

10. The "top" is defined solely by pressure. The "time limit" for ascent is reached when all the time remaining before the next ascent is needed for descent.

Figure 10:
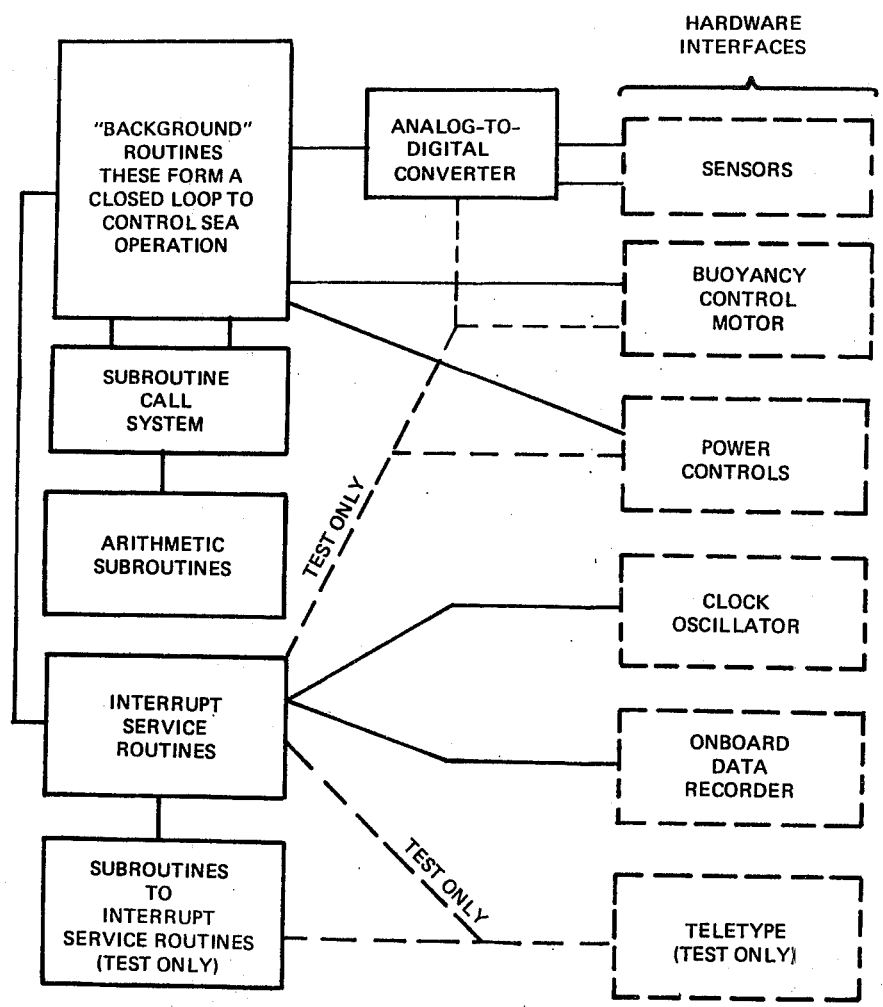
FIG. 10 shows an overview of the background and interrupt routines for the microprocessor of the ECS of FIG. 4.
Figure 11:
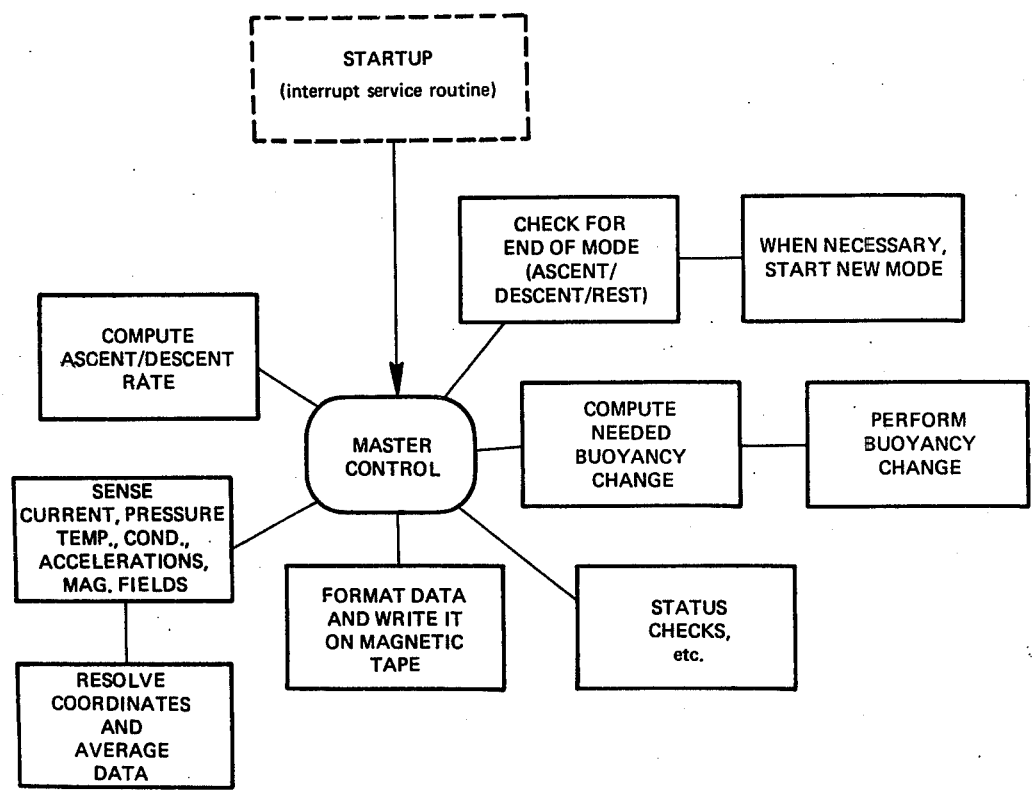
FIGS. 11–13 show component routines for the background, arithmetic and service tasks for the microprocessor of the ECS of FIG. 4.
Figure 12:
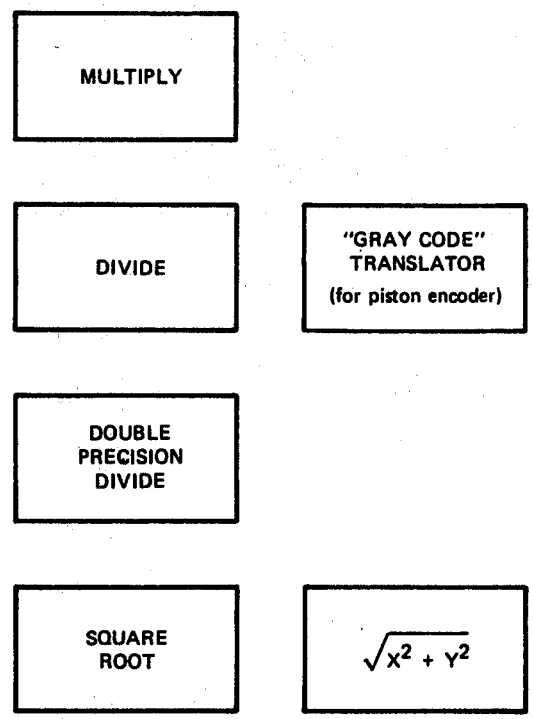
Figure 13:
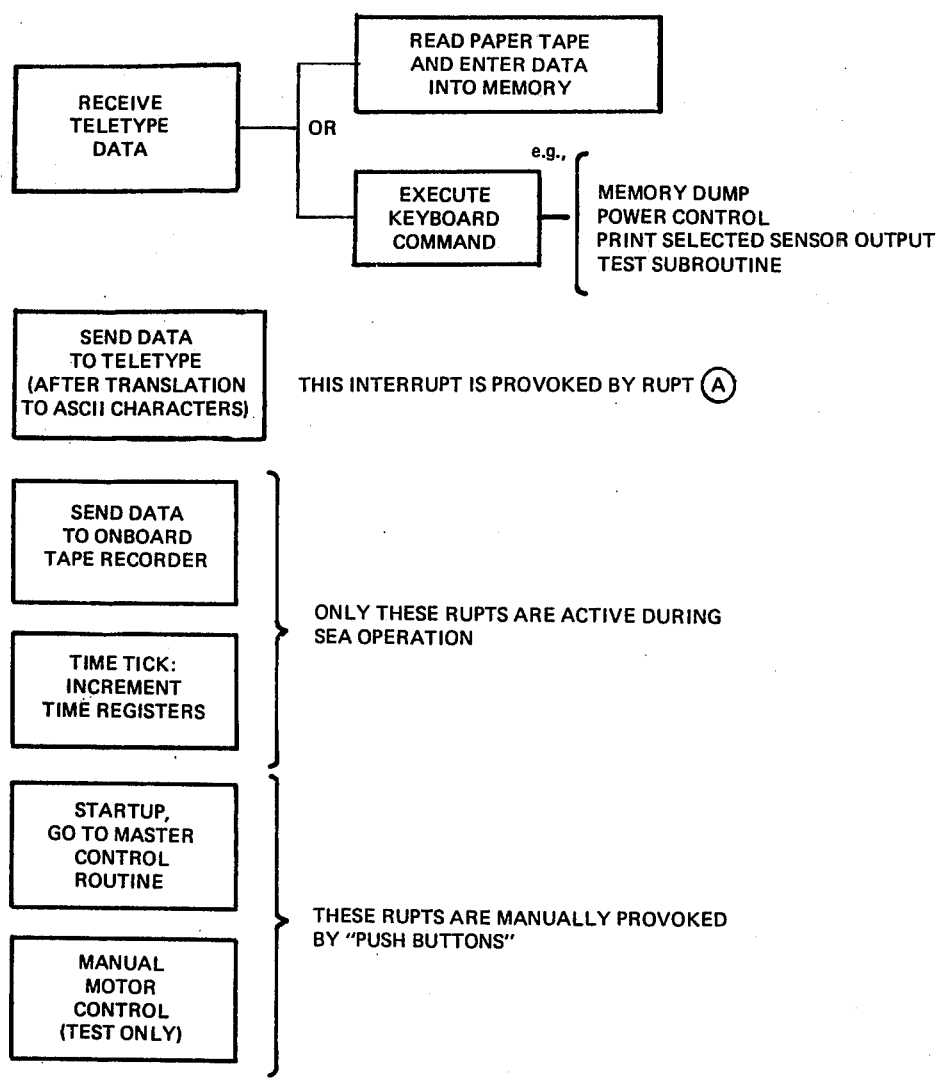
Figure 14:
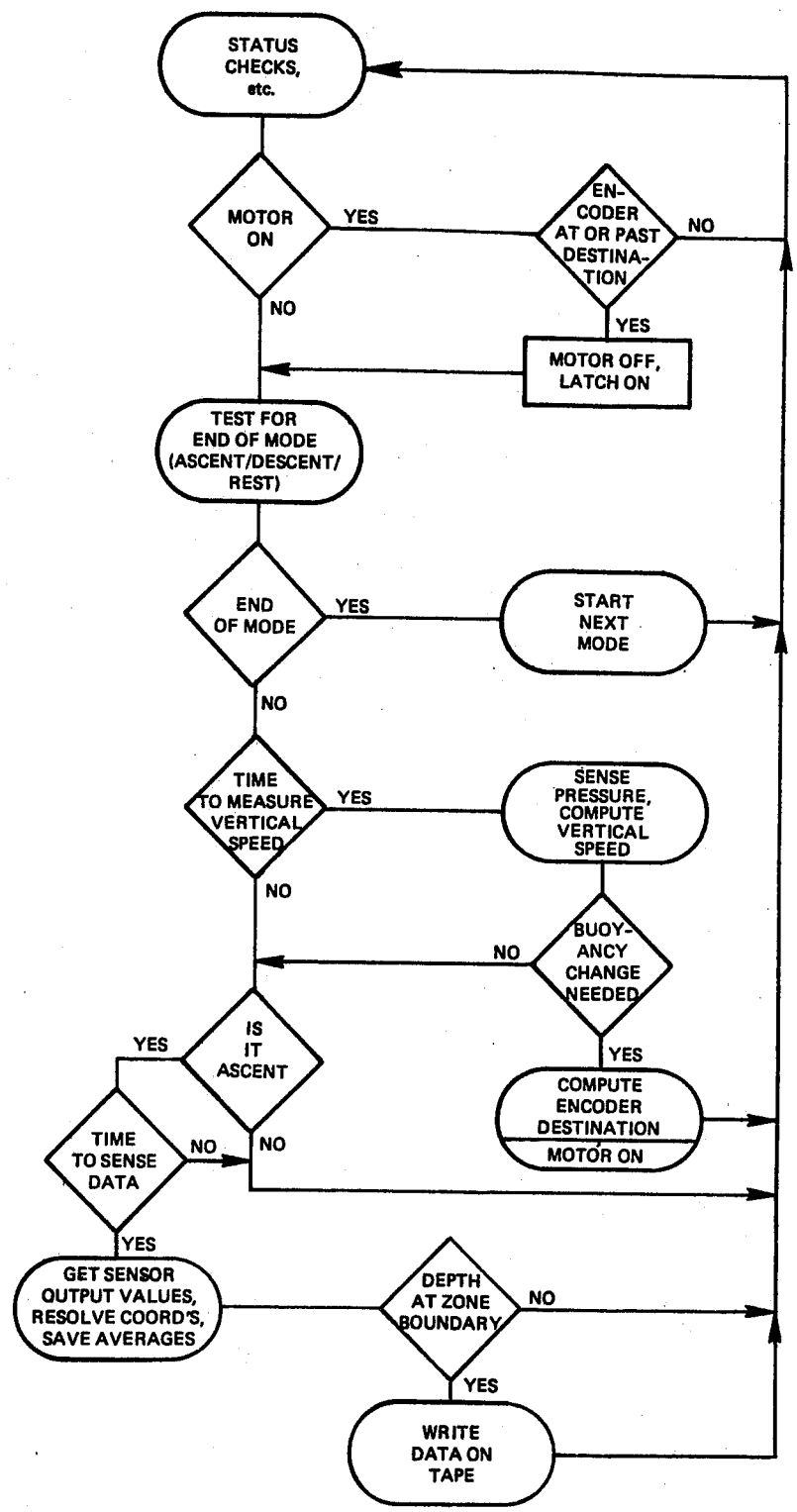
FIG. 14 shows in detailed flow chart form, the master control routine for the microprocessor of the ECS of FIG. 4.

The microprocessor 150 is functionally equivalent to a Digital Equipment Corporation PDP8/E computer using the same instruction set. FIG. 10 shows an overview of the background and interrupt routines and how those routines interrupt with the hardware. FIGS. 11-13 show major component routines of the background and arithmetic subroutines, and interrupt service routines, respectively. FIG. 14 is a detailed flow chart of the logic of the master control routine. From these flow charts and the above description, the particular instructions for executing them for controlling the operation of system 1 may be readily configured by one skilled in the art.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A system for measurement of ocean current near the surface wave field, comprising:
    an adjustable buoyancy platform and associated current sensor affixed thereto, and
    means to limit said platform to motion along a mooring line passing between two vertically displaced points, and to maintain said platform substantially free to move in the vertical direction in response to pressure gradients from said surface wave field, said means including an upper roller assembly affixed to the top of said platform and a lower roller assembly affixed to the bottom of said platform, said roller assemblies each including a plurality rollers adapted to freely track said mooring line.

2. A system according to claim 1 further comprising an attitude reference system and associated computing means to generate flow signals representative of said current.

3. A system according to claim 2 wherein said attitude reference system and computing means includes means to resolve said flow signals into signal representative of orthogonal components of said current.

4. A system according to claim 1 wherein at least one of said roller assemblies includes three rollers staggered along the axis of said mooring line.

5. A system according to claim 1 wherein said platform is substantially symmetrical about a polar axis, and wherein said roller assemblies are adapted to maintain said polar axis coaxial with the axis of said mooring line.

6. A system according to claim 5 wherein for each of said roller assemblies, the axes of said rollers are aligned whereby the projection of said roller axes in a plane perpendicular to said polar axis circumscribes said mooring line.

7. A system according to claim 1 or 6 wherein at least one of said roller assemblies includes three rollers having axes oriented 120 degrees apart.

* * * * *